United States Patent
Bernhardt et al.

(10) Patent No.: US 6,764,270 B1
(45) Date of Patent: Jul. 20, 2004

(54) TELESCOPING IMPLEMENT ATTACHMENT FOR A MOTOR VEHICLE

(75) Inventors: Gerd Bernhardt, Bannowitz (DE); Mario Wünsche, Radeberg (DE); Sergiy Fedotov, Dresden (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/447,363

(22) Filed: Nov. 23, 1999

(30) Foreign Application Priority Data

Dec. 11, 1998 (DE) .......................................... 198 57 167

(51) Int. Cl.[7] .................................................. E02F 9/00
(52) U.S. Cl. ..................................... 414/718; 414/685
(58) Field of Search ................................ 414/680, 685, 414/703, 718; 212/292; 180/53.1, 53.3

(56) References Cited

U.S. PATENT DOCUMENTS

| | | | | |
|---|---|---|---|---|
| 3,288,316 A | * | 11/1966 | West .......................... | 414/685 X |
| 3,305,118 A | * | 2/1967 | Lull ........................... | 414/718 X |
| 3,937,339 A | | 2/1976 | Geis et al. | |
| 4,257,732 A | * | 3/1981 | Staffanson ............... | 414/685 X |
| 4,340,240 A | * | 7/1982 | Anderson ................. | 414/703 X |
| 4,379,673 A | * | 4/1983 | Takahashi et al. ...... | 414/703 X |
| 4,746,254 A | * | 5/1988 | Langenfeld et al. ...... | 414/703 |
| 4,822,237 A | * | 4/1989 | Meyer et al. ............. | 414/718 X |
| 5,169,277 A | * | 12/1992 | Orser et al. ............... | 212/292 X |

FOREIGN PATENT DOCUMENTS

| | | |
|---|---|---|
| FR | 1 075 415 | 10/1954 |
| FR | 93 073 | 2/1969 |
| FR | 2 694 316 A1 | 2/1994 |
| GB | 797 804 | 9/1954 |
| GB | 2 289 036 | 11/1995 |

\* cited by examiner

*Primary Examiner*—Donald W. Underwood

(57) ABSTRACT

A motor vehicle for industrial and/or agricultural operations, in particular an agricultural tractor, is described with an attachment interface containing a three-point implement hitch (24). In order to widen the spectrum of applications of the vehicle and the capability of the attachment interface and in order to open up new areas of application for the motor vehicle, a telescoping arm (16) that can be pivoted in the vertical direction is connected in a joint to the vehicle chassis (14). A support (22) is arranged at the free, extensible end of the telescoping arm (16) and carries the attachment interface for the three-point implement hitch (24). A locking arrangement (38, 40) is provided by which the support (22) can be immobilized with respect to the vehicle chassis (14), when the telescoping arm (16) is in an operating position.

9 Claims, 8 Drawing Sheets

TELESCOPING IMPLEMENT ATTACHMENT FOR A MOTOR VEHICLE

BACKGROUND OF THE INVENTION

The invention relates to a motor vehicle for industrial and/or agricultural applications, in particular for an agricultural tractor, with an attachment interface containing a three-point implement hitch at either the rear end or front end of the vehicle.

Agricultural tractors in particular, but also other utility vehicles employed in agricultural or industrial application, are used primarily as working machines for performing operations in the field. For this purpose an appropriate implement can be attached to the vehicle. In contrast to single-purpose machines, the tractor is therefore an open system that can become a machine capable of useful operations by being coupled to an implement.

Since a work vehicle should be capable of being coupled to various implements for the performance of various operations, the attachment interface between the motor vehicle and the implement takes on a particular significance. The term attachment interface is understood to include all devices that are required in order to couple implements to the motor vehicle and, if necessary, to supply them with propulsion power.

A usual attachment interface, with which most agricultural tractors and similar agricultural motor vehicles are equipped today, contains a so-called three-point implement hitch as it is defined, for example, by standards ISO 730 or DIN 9674. Such a hitch includes two lift arms, connected to each other by a lift shaft, each of which engages an associated hydraulic power lift cylinder. Each lift arm is connected through a lift rod or a lift spindle with an associated lower steering arm, which carries a lower coupling point. Furthermore, the three-point implement hitch contains an upper steering arm connected in a joint with the tractor body with a third, central, upper coupling point.

The three-point implement hitch makes it possible to mount implements by simple means to the agricultural tractor. For this purpose the tractor is driven up to the implement previously deposited on the ground. The coupling points are coupled to corresponding recesses of the implement, so that the utility vehicle and the implement form a fully-functional processing unit. If necessary, a power take-off shaft of the utility vehicle is connected with the input shaft of the implement. Electrical and hydraulic connections for the transmission of power and signals can be established between the utility vehicle and the implement. By actuating the power lift cylinders the implement can be raised and its height controlled within certain limits, in order to move between a transport position and a desired operating position. In many cases the implement does not here require its own chassis.

Despite the multiple applications for the three-point implement hitch the spectrum of applications for the motor vehicle is still limited.

The problem underlying the invention is seen as that of developing a motor vehicle of this class in such a way that its spectrum of applications is broadened. In particular the capability of the attachment interface should be expanded in order to open up new areas of application for the motor vehicle.

SUMMARY OF THE INVENTION

The motor vehicle according to the invention for industrial and/or agricultural operations contains an attachment interface at the rear of the vehicle or at the front of the vehicle with a three-point implement hitch that is preferably configured according to ISO 730 or DIN 9674. The-three-point implement hitch is carried by a vertically pivoted, telescoping arm connected by a joint to the vehicle chassis, for example, to the vehicle body, a vehicle frame or the vehicle superstructure. A support at the free end of the telescoping arm carries the attachment interface with the three-point implement hitch. Furthermore a locking arrangement is provided by means of which the support can be selectively immobilized with respect to the vehicle chassis when the telescoping arm is, for example, in a retracted and lowered operating position.

As a result of the telescoping attachment interface with a three-point implement hitch, new application areas for the motor vehicle are opened up, in particular for agricultural tractors. It makes possible, on the one hand, the performance of all operations that could be accomplished with a conventional three-point implement hitch. On the other hand, a large loader height is constantly available on the rear end of the vehicle or on the front end of the vehicle. The motor vehicle according to the invention makes possible the movement of implements with enlarged degrees of freedom and a wider range of lifting heights. It can be employed, on the one hand, as conventional tractor with a conventional attachment interface and, on the other hand, as a fully functioning loader.

A preferred application is seen in the case of a normal operating process (plowing) that can be performed and that the implement (the plow) can be raised to such a degree that it can be deposited on a trailer or an elevated deposit location without any additional equipment. Due to the simple, rapid loading, a rapid change between different operating sites, separated by some distance, is possible, in that after one operating application, the implement is loaded onto a trailer, the trailer coupled to the motor vehicle and driven to a new operating location at high vehicle speed. The lifting of implements is possible up to, for example, the height of the upper edge of the vehicle cab, so that the implements can be raised to a height to permit deposit on shelves or trailers without having to remove them first from the three-point implement hitch.

A further advantage of the telescoping attachment interface lies in the fact that the coupling of attached implements and, for example, the carrying with the earth scoop through horizontal movements of the telescopic arm can be accomplished without any movement of the tractor.

Preferably the attachment interface contains, in addition to the three-point implement hitch, further attachment arrangements and/or coupling arrangements that can be fastened to the support. In that way the functions of current day one-point hitches such as towing hooks, towbars, towing coupling and the like can be provided. In all embodiments, towing eyes of an implement to be attached can be taken up from the ground and brought into operating position hydraulically.

Preferably, the telescoping arm is attached in the center with respect to the width of the vehicle, behind the operator's platform, in particular behind the operator's cab and ahead of the rear axle, resulting in a telescoping rear interface. Here the motor vehicle may be configured to great advantage as a center seat tractor or a front seat tractor.

According to a preferred embodiment of the attaching implement interface of the present invention, the telescoping arm contains generally an outer pivoting component connected by a joint to the vehicle chassis, and at least an extensible insert that is used to control its length. At the free end of the insert, the support is attached which carries a three-point implement hitch.

According to a particularly simple development of the invention, the telescoping arm contains two concentric components that can be inserted into each other. These may be configured as rectangular profiles that offer a high resistance to torque and that make possible a simple design of the sliding guides and the support points for lifting arrangements. For certain applications, the use of a telescoping arm with at least three components inserted into each other may be advantageous.

According to preferred further developments of the invention, the pivoting and extension movement of the telescoping arm and, if necessary, the relative movement of the support relative to the telescoping arm, is performed by pressurized fluid piston and cylinder units, appropriately by double acting hydraulic cylinders. These can be supplied with pressurized hydraulic fluid by the hydraulic system of the motor vehicle. In particular for the extension and retraction of the components, at least one extension cylinder can be provided between the pivoting component and an extensible insert or in each case between the components of the telescoping arm. Preferably two hydraulic cylinders that act effectively in parallel engage, on the one hand, the vehicle chassis and, on the other hand, the telescoping arm, in order to move the attached implement in the vertical direction.

In order to bring the support into a desired defined direction or to hold it in a defined position, it is advantageous to connect the support by a joint to the free end of the telescoping arm, for example, with the free end of an extensible insert. Between the telescoping arm or the vehicle superstructure on the one hand and the movable support on the other hand, at least one double acting pivoting cylinder is arranged, by means of which the support can be pivoted and directed.

In a number of operations, the implement should maintain a desired orientation relative to the ground, even though the telescoping arm is moved. For this purpose it is particularly advantageous if the pivoting system is configured in such a way that the coupling plane is maintained vertically, or in any other desired orientation, regardless of the inclination of the telescoping arm. For this purpose, a preferred further development of the invention provides a level control arrangement that controls the at least one pivoting cylinder in such a way that the implement is retained in a desired orientation relative to the ground, regardless of the pivoted position of the telescoping arm. To determine a present value signal for the level control arrangement, the direction of the desired orientation of the implement can be monitored by an appropriate sensor with the orientation maintained by the hydraulic control in a known manner.

It has also been shown as advantageous to provide an adapter that can be fastened to the three-point implement hitch which is used to accept special implements whose attachment interface is not defined by the aforementioned standard for a three-point implement hitch. This combination can replace a conventional front loader. This configuration makes it possible, for example, to perform all operations that were previously accomplished with a front loader as long as the front loader implements (earth scoop, stackerfork etc.) are fastened by means of special adapters to the three-point implement hitch.

BRIEF DESCRIPTION OF THE DRAWINGS

The drawing shows an embodiment of the invention on the basis of which the invention as well as further advantages and advantageous further developments and embodiments of the invention shall be explained and described in greater detail in the following.

DESCRIPTION OF THE PREFERRED EMBODIMENT

Figure 1:
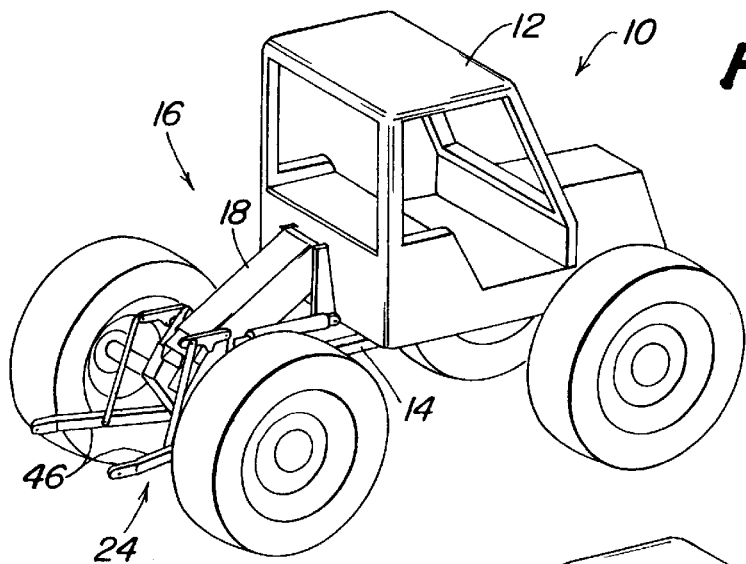
FIG. 1 shows a schematic perspective view of a motor vehicle according to the invention with telescoping rear interface in the operating position.
Figure 2:
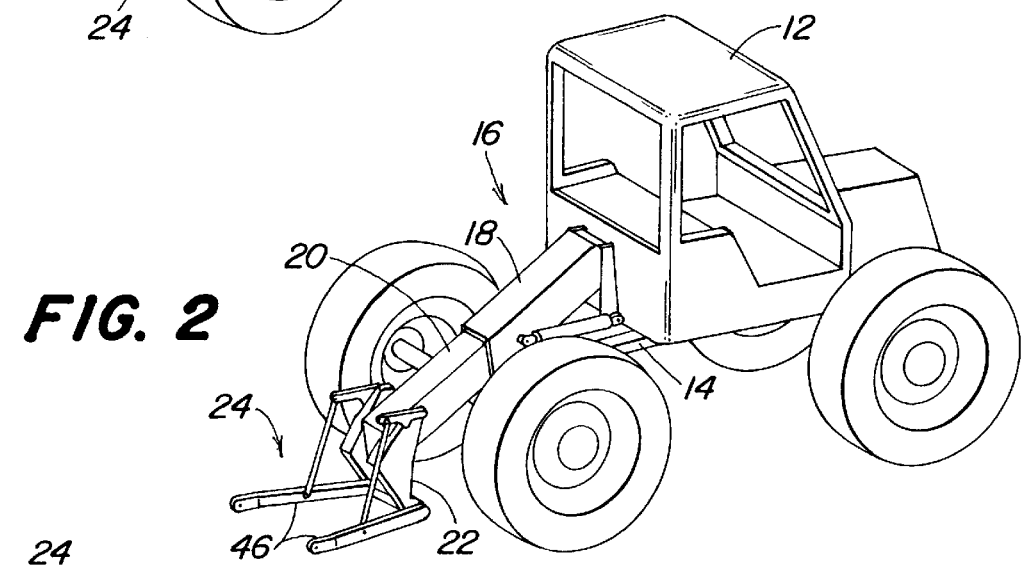
FIG. 2 shows a motor vehicle according to FIG. 1 with the telescoping rear interface lowered.
Figure 3:
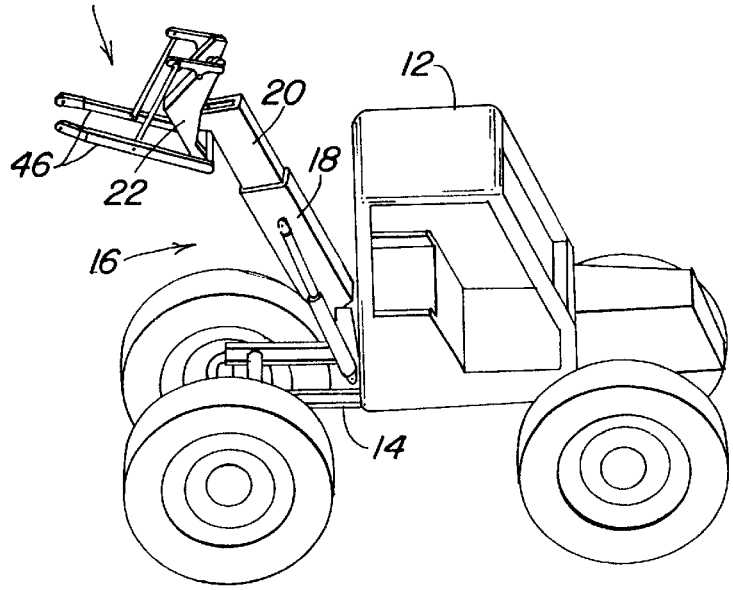
FIG. 3 shows a motor vehicle according to FIG. 1 with the telescoping rear interface raised.

A utility vehicle 10 is shown in FIGS. 1 through 3 and includes an operator's cab 12. Behind the operator's platform 12 and centered with respect to the transverse extent of the vehicle, a telescoping arm 16 is connected in a joint to the vehicle chassis 14 and is provided with a pivoting component 18 with an extensible insert 20. At the free end of the insert 20 a support 22 is connected in a joint and is fastened to a three-point implement hitch 24 together with further attachment arrangements, not shown in any further detail in FIGS. 1 through 3, whose attachment interface preferably corresponds to the standards. Further attachment arrangements may also be fastened directly to the vehicle chassis.

The attachment interface can be operated in two modes, an operating mode and a lift mode:

For the operating mode, FIG. 1 shows the telescoping arm 16 in retracted and locked position. This position is the transport position as well as the operating position for all operations with three-point attachment. The support 22 is rigidly connected and locked to the vehicle chassis 14. All loads are transmitted by the support 22 directly through the locking arrangement as described below to the vehicle chassis 14, so that telescoping arm 16 is unloaded. In this position a power take-off shaft, not shown in FIGS. 1 through 3, of the utility vehicle can be connected to the input shaft of the implement as well as electrical and/or hydraulic connections that can be established for the transmission of power and signals between the utility vehicle and the implement. The towing operating mode is activated after coupling the implement by actuation of the locking arrangement. The towing operating mode corresponds to that of a conventional three-point implement hitch attachment.

The lift mode is shown in FIGS. 2 and 3 in which the unlocked support 22 can be pivoted by lift cylinders and extended by extension cylinders. FIG. 2 shows the telescoping arm 16 in its extended and lowered, unlocked position. This position is appropriate for picking up implements. For example, in this position the towing eye of an implement or trailer can be taken up from the ground. Thereby the functions coupling the implement and picking up the hitch can be performed. Depending on the configuration, the telescoping arm functions as a rigid tow bar (with partial extending) and the height of the attachment coupling can be adjusted by raising or lowering.

FIG. 3 shows the telescoping arm in a raised and far extended position. This is the lift mode for the performance of lifting and loading operations or for taking up and depositing implements deposited at high elevations. With this mode, for example, implements can be loaded onto and unloaded from trailers.

Details of the telescoping rear interface are revealed by FIGS. 4 through 12. The telescoping arm 16 shown in these figures consists generally of two concentric components that can be inserted into each other with a rectangular profile. A component configured as pivoting component 18 is connected in a joint 26, fixed to the chassis 14 and connected to the vehicle in such a way that it can be pivoted in a vertical direction. The pivoting is performed by two lifting cylinders 28 arranged to both sides of the pivoting component 18, that in each case engage with one end the vehicle chassis 14 and with the other end the outer contour of the pivoting component 18.

Within the pivoting component 18 there is arranged a component 20 configured as an insert, that can be retracted and extended in axial direction within the pivoting component 18 by means of an extension cylinder 30. For this purpose one end 31 (FIG. 4) of the extension cylinder 30 is fastened to the pivoting component 18 and its other end 33 is fastened to the insert 20. The extension cylinder 30 can be arranged within the insert 20 so as to save space. It should be understood that the configuration of the telescoping arm, in place of the two components, three concentric components could also be employed that preferably can be inserted telescoping into each other.

Figure 5:
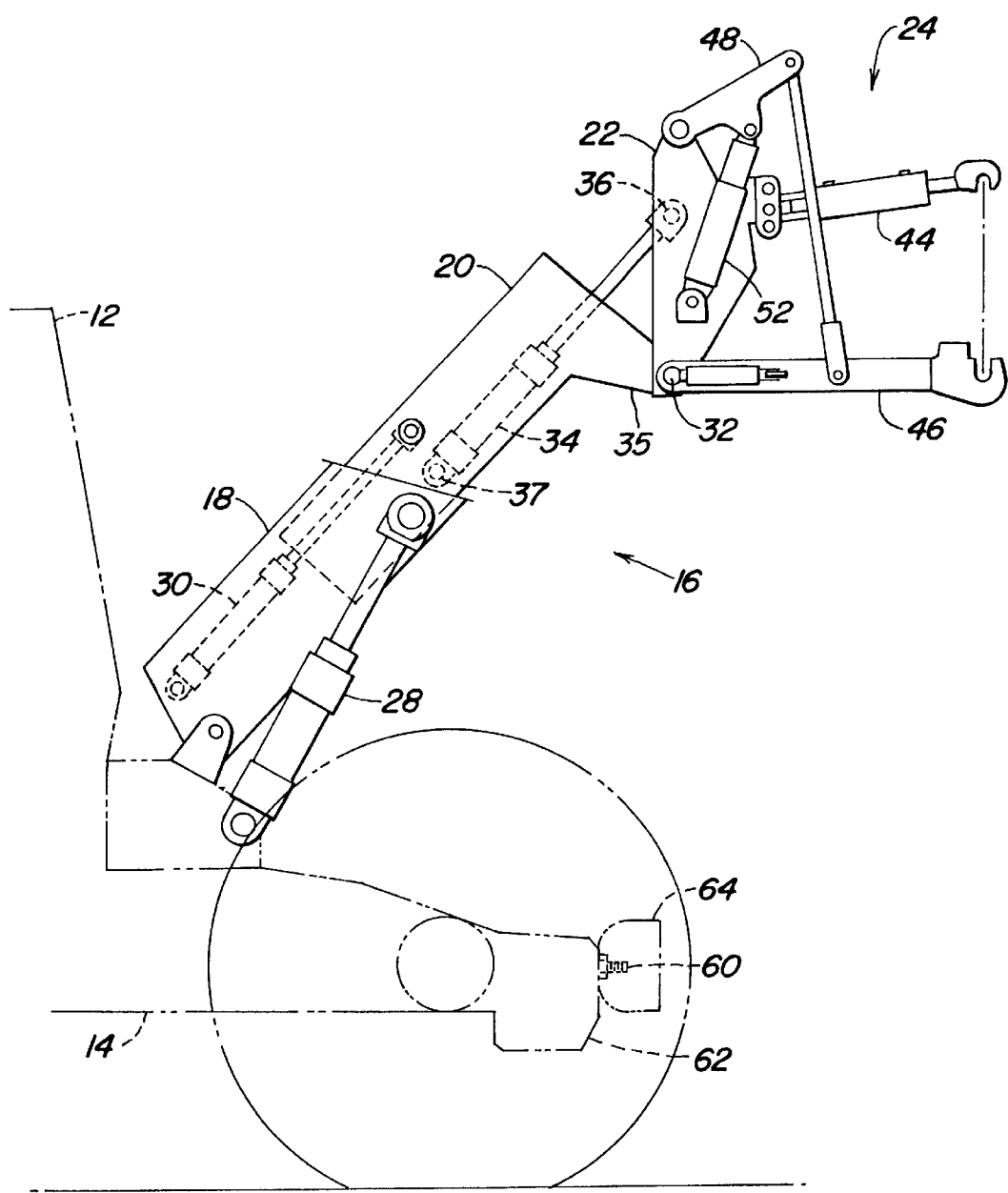
FIG. 5 shows a side view corresponding to FIG. 4 in which the telescoping arm is in its highest position.

The free end of the insert 20 projecting from the pivoting component 18 carries a component 35 that is angled downward and can be seen in FIG. 5 and that is provided with a connecting joint 32. A support 22, free to pivot, is fastened to the insert 20 through the connecting joint 32. A pivoting cylinder 34 is provided in order to pivot the support 22 about the horizontal axis of the connecting joint 32.

Figure 4:
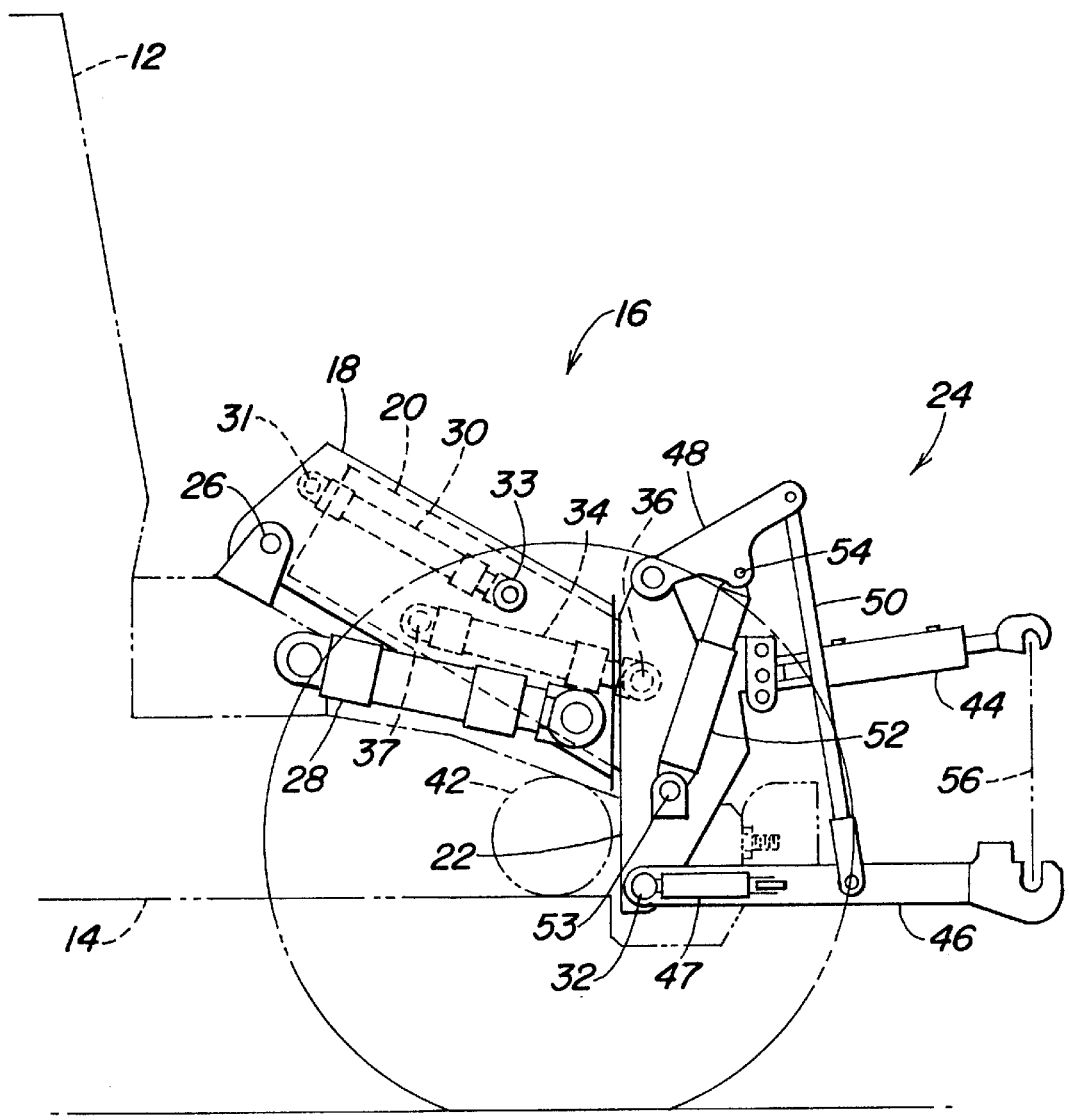
FIG. 4 shows the schematic side view of the rear region of a motor vehicle with the telescoping rear interface in the lowered position of the telescoping arm, whose support can be pivoted by an internal pivoting cylinder.

According to FIGS. 4 and 5, the pivoting cylinder 34 extends generally within the insert 20 and is fastened in a joint with its one end 37 to the insert 20 and with its other end to a connecting joint 36 of the support 22. In contrast thereto in the embodiment shown in FIGS. 6 and 7 the pivoting cylinder 34a is arranged outside the insert 20 and above the telescoping arm 16 and engages with its one end the operator's platform 12 or chassis 14 and with its other end a connecting joint 36a of the support 22a.

Figure 6:
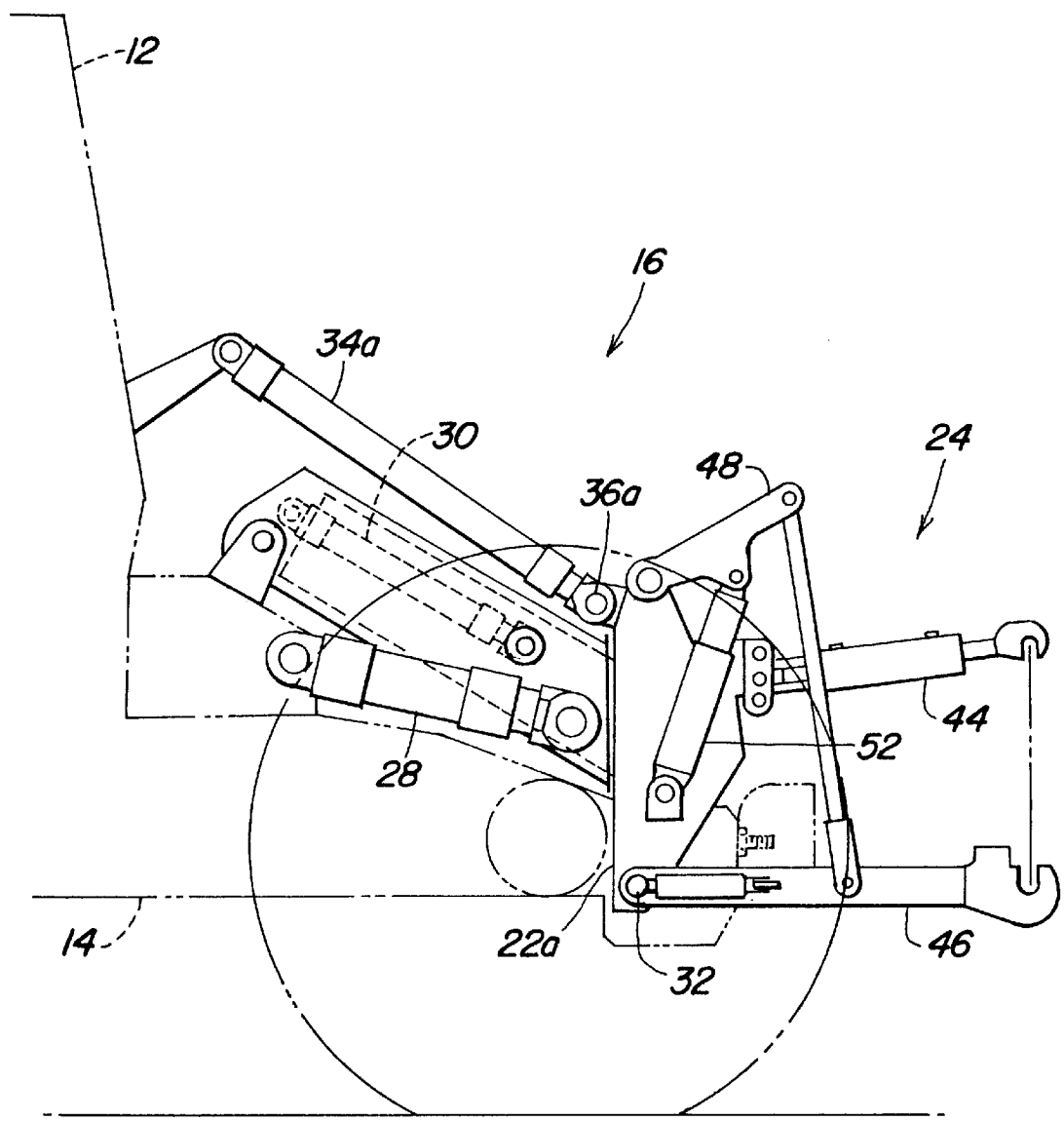
FIG. 6 shows a schematic side view of the rear region of a motor vehicle with the telescoping arm in its lowered position, whose support can be pivoted by an outer pivoting cylinder.
Figure 7:
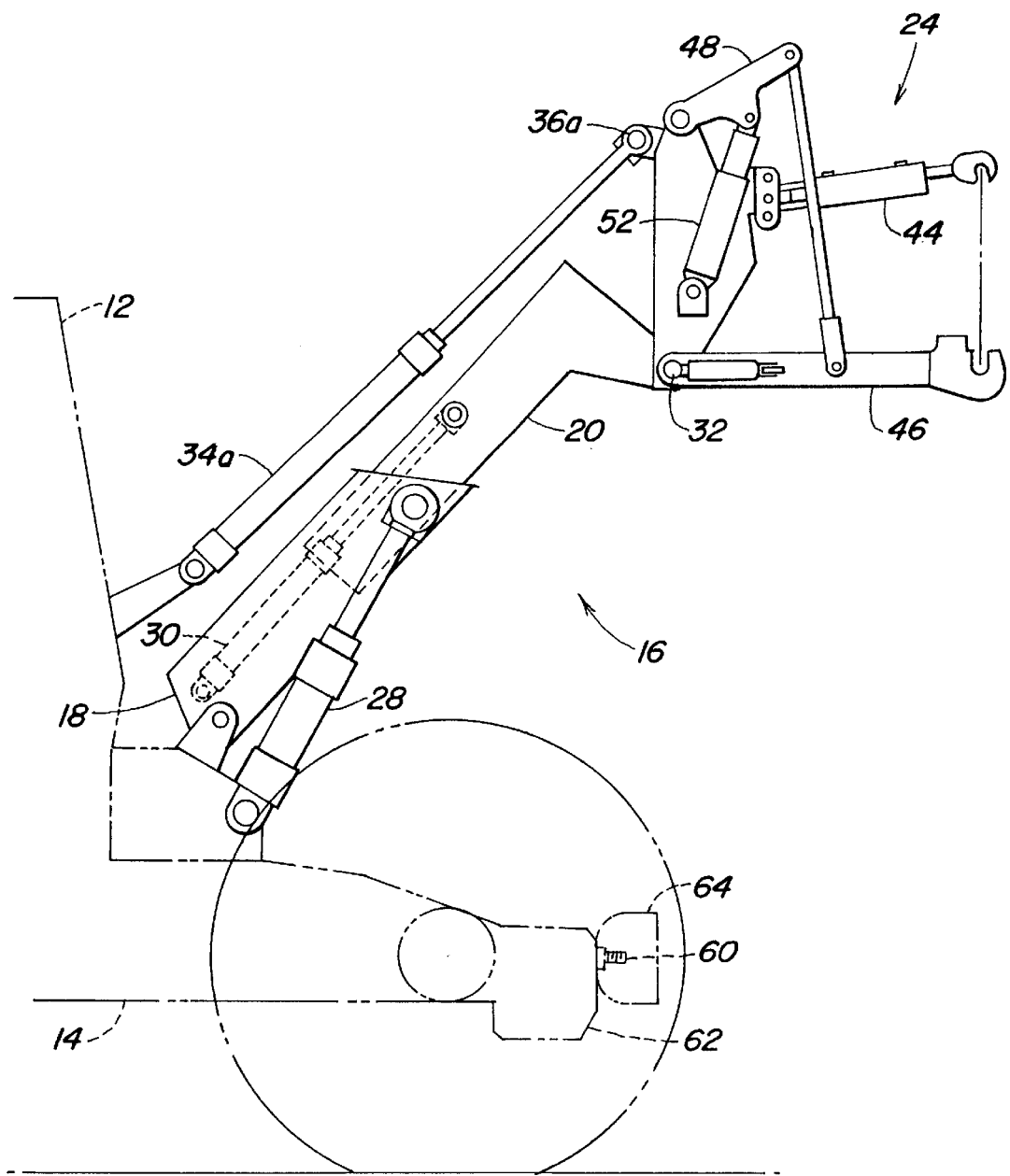
FIG. 7 shows a side view corresponding to FIG. 6 in which the telescoping arm is in its highest position.

By actuating the pivoting cylinder 34, 34a, the support 22, 22a can be pivoted in the clockwise and counterclockwise direction from its locked operating position shown in FIGS. 4 and 6 about the horizontal connecting joint 32.

The support 22 can be locked with respect to the vehicle chassis 14, which is explained with reference to FIG. 8. The locking arrangement shown is suitable for all the embodiment variations shown in the figures. For the purpose of locking, two catching hooks 40 may be used that are open upward and that are rigidly fastened each to one of the two axle housings 42 and that are offset to the side of the longitudinal axis of the vehicle. However, with a spring suspension for the axle it is recommended that the catching hooks 40 be fastened to the vehicle chassis 14. Two projections 38 are arranged on the support 22 and extend transverse to the longitudinal centerline of the vehicle. The projections 38 are adapted to fit in the slot-shaped recesses of the catching hooks 40 that are open upward. The projections 38 can be received into the recesses. They can be locked within the recesses of the catching hooks 40. The arrangement for this locking is not shown in any further detail. Appropriate locking mechanisms, for example, may be of the type as are usual for the quick coupling of lower steering arms. The locking arrangement between the support 22 and the vehicle chassis 14 can alternatively be performed by the use of a lock or the arrangement of corresponding bores and headed pins.

The locking of the support 22 to the vehicle chassis 14 can provide assurance that during transport operations or operations with an implement, the support 22 and with it the attachment interface is immobilized with respect to the vehicle chassis and does not move relative to it. This is particularly advantageous during operations which utilize the power take-off shaft.

Upon locking, the forces generated in the support 22 are transmitted directly into the rear axle or into the vehicle chassis 14 without affecting the telescoping arm 16. Thereby the towing loads are transmitted directly to the vehicle chassis, in particular during towing or transport operations, so that the telescoping arm is not loaded during these types of operations and therefore can be designed for relatively light loads.

The support 22 carries a three-point hitch with an upper steering arm 44 and two lower steering arms 46 at the sides, each of which is connected in joints to the support 22 in the usual manner, free to pivot. The lower steering arms 46 can be raised and lowered by associated lifting arms 48 and lifting struts 50 connected in joints to the support 22. The actuation of the lifting arms is performed in the usual manner by power lift cylinders 52, one end 53 (FIG. 4) of each of which is connected in a joint to the support 22 and whose other end is connected in a joint 54 of the associated lifting arm 48.

Figure 8:
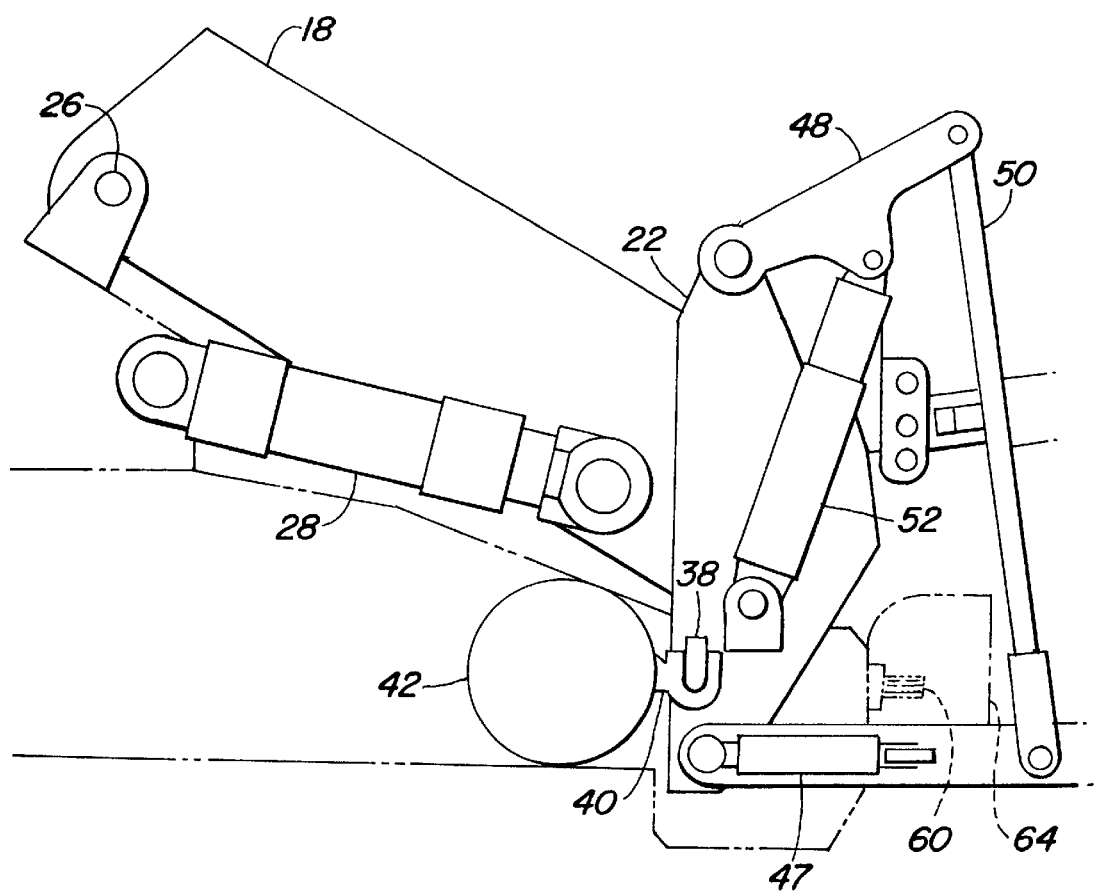
FIG. 8 shows a schematic side view of the rear region of a motor vehicle with telescoping rear interface illustrating the locking arrangement for the three-point implement hitch.

The transverse movement of the lower steering arms 46 can be limited by the usual stabilizing steering arms 47 (FIGS. 4 and 8). The free ends of the lower steering arms 46 can be connected with the free end of the upper steering arm 44 by an implement pole 56 that is merely indicated (FIG. 4).

Furthermore a power take-off shaft 60 (FIGS. 5 and 7) projects from a power take-off shaft gearbox housing 62 (FIG. 5). The power take-off shaft gearbox housing 62 is formed onto a vehicle gearbox housing, not shown in any further detail. The power take-off shaft 60 is covered by a usual power take-off shaft protective shield 64.

The lifting cylinders 28, the extension cylinder 30 and the pivoting cylinder 34 may be configured as double-acting hydraulic cylinders. The hydraulic supply is provided by the on-board vehicle hydraulic system. The operation of the hydraulic cylinders is performed by control devices arranged in the vehicle cab, through which hydraulic valves can be actuated, in order to control the hydraulic oil flow in a corresponding manner. The power lift cylinders 52 are actuated or controlled in the usual manner. A level control arrangement, known in itself and not shown in any further detail, is used to control the pivoting cylinder 34 and the vertical direction of the support 22 into a desired operating position.

Figure 10:
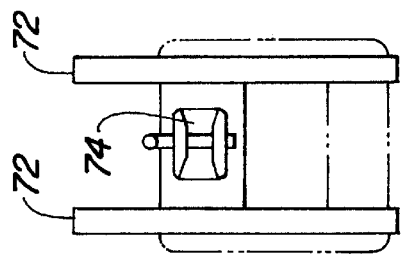
FIG. 10 shows the coupling arrangement of FIG. 9 as seen from the rear.
Figure 9:
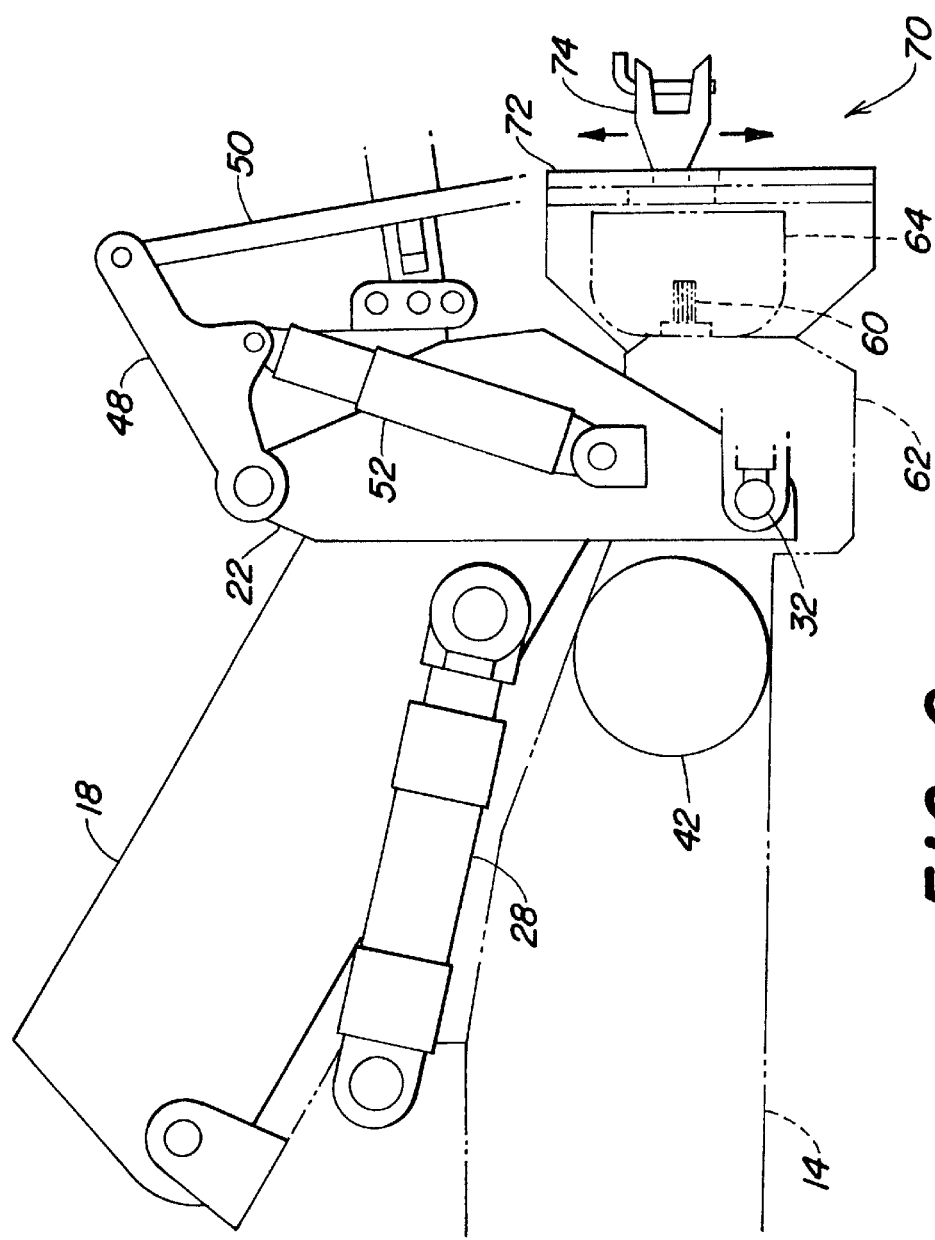
FIG. 9 shows a schematic side view of the rear region of a motor vehicle with telescoping rear interface illustrating an additional coupling arrangement fastened to the vehicle body.

FIGS. 9 and 10 reveal an attachment arrangement 70 that is fastened to the power take-off shaft gearbox housing 62. This is a conventional attachment arrangement that can be varied in height with two guide rails 72 at the side that guide an attachment coupling 74. The attachment coupling can be adjusted in height and can be locked in various height positions. The fastening of the attachment arrangement 70 to the stationary power take-off shaft gearbox housing 62 has the advantage that the design of the telescoping rear interface is not loaded by the coupling of implements.

Figure 12:
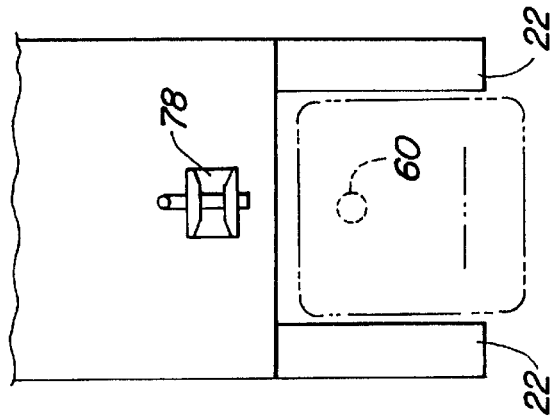
FIG. 12 shows the coupling arrangement of FIG. 11 as seen from the rear.
Figure 11:
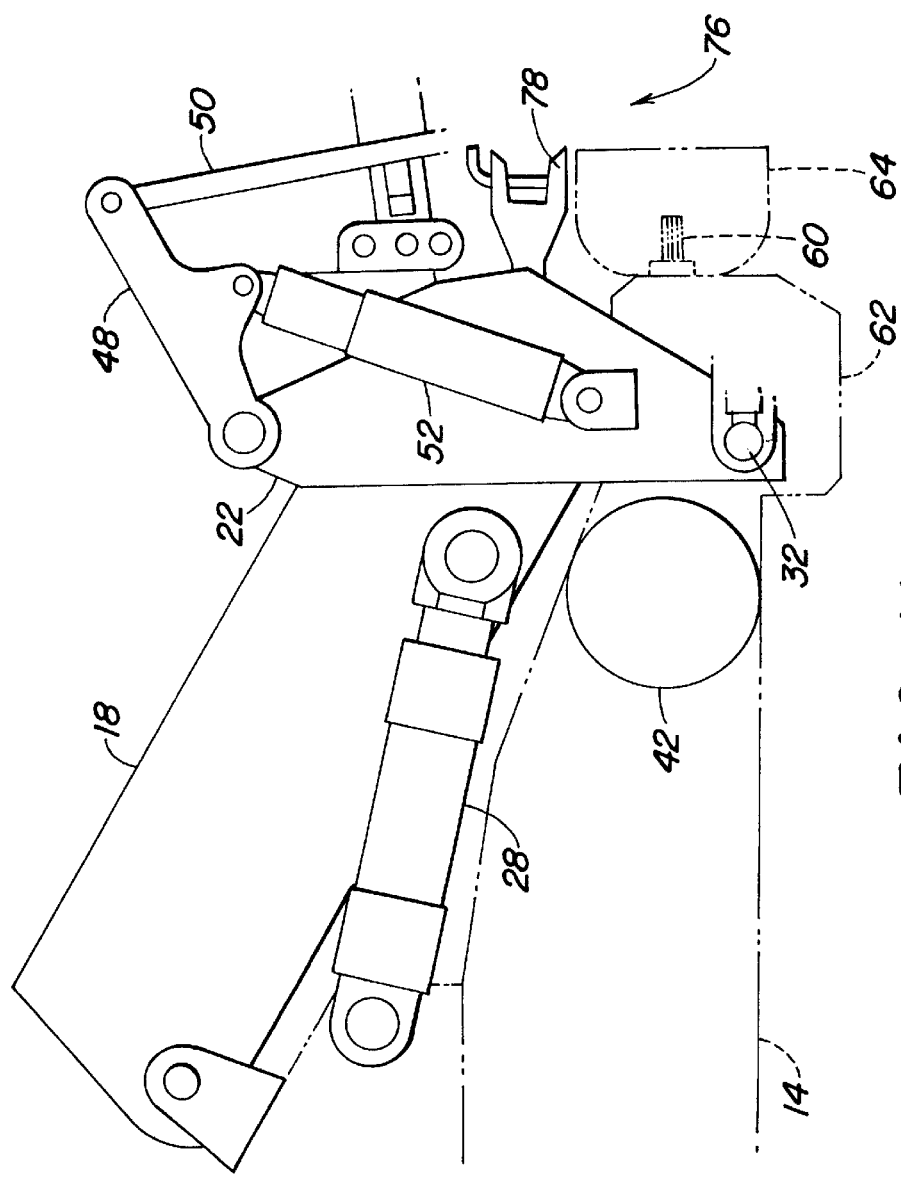
FIG. 11 shows a schematic side view of the rear region of a motor vehicle with telescoping rear interface illustrating another embodiment of the additional coupling arrangement fastened to the three-point implement attachment hitch.

FIGS. 11 and 12 reveal an alternative configuration for an attachment arrangement 76. Here the attachment coupling 78 is fastened to the three-point attachment support 22. This embodiment is simpler in design than the configuration shown in FIGS. 9 and 10, since the guide rails 72 can be omitted. The height adjustment is performed by the telescoping arm.

The invention should not be limited to the above-described embodiments, but should be limited solely by the claims that follow.

ASSIGNMENT

The entire right, title and interest in and to this application and all subject matter disclosed and/or claimed therein, including any and all divisions, continuations, reissues, etc., thereof are, effective as of the date of execution of this application, assigned, transferred, sold and set over by the applicant(s) named herein to Deere & Company, a Delaware corporation having offices at Moline, Ill. 61265, U.S.A., together with all rights to file, and to claim priorities in connection with, corresponding patent applications in any and all foreign countries in the name of Deere & Company or otherwise.

We claim:

1. A motor vehicle for industrial and/or agricultural operations comprising
   a vehicle chassis (14);
   a telescoping arm (16) connected to the chassis by a pivot joint for vertical pivoting of the telescoping arm, the telescoping arm having a free end that can be extended;
   an attachment interface at the free end of the telescoping arm including a support (22) carrying a three-point implement hitch (24); and
   a locking arrangement (38, 40) associated with the support (22) and the chassis (14) which transmits draft loads directly to the vehicle chassis when the telescoping arm (16) is in a predetermined operating position.

2. The motor vehicle according to claim 1 further comprising a second attachment arrangement (70, 78).

3. The motor vehicle according to claim 1 wherein the telescoping arm (16) is connected to the chassis along a longitudinal center, behind an operator's platform (12) and ahead of a rear axle of the motor vehicle.

4. The motor vehicle according to claim 1 wherein the telescoping arm (16) contains a pivoting component (18) that is connected by a joint to the vehicle chassis (14), free to pivot, and contains at least one extensible insert (20).

5. The motor vehicle according to claim 1 wherein the telescoping arm (16) is provided with two components (18, 20) which are concentric and can be slid one into the other.

6. The motor vehicle according claim 1 wherein the telescoping arm has at least three concentric components that can be slid into each other.

7. The motor vehicle according to claim 4 further comprising at least one extension cylinder (30) between the pivoting component (18) and the extensible insert (20) configured as a pressurized fluid piston cylinder unit for the extension and retraction of the insert (20).

8. The motor vehicle according to claim 1 further comprising at least one lifting cylinder (28) that is configured as a pressurized fluid piston and cylinder unit and that is provided between the vehicle chassis (14) and the telescoping arm (16) for the vertical pivoting of the telescoping arm (16).

9. The motor vehicle according to claim 1 wherein the support (22) that is connected in a joint with the free end of the telescoping arm (16) and that between the telescoping arm (16) or the vehicle superstructure (14) on the one hand and the support (22, 22*a*) on the other hand, at least one pivoting cylinder (34, 34*a*) configured as a pressurized fluid piston and cylinder unit is provided for the pivoting of the support (22) in the vertical direction.

* * * * *